United States Patent
Samra et al.

(10) Patent No.: US 7,051,190 B2
(45) Date of Patent: May 23, 2006

(54) INTRA-INSTRUCTION FUSION

(75) Inventors: Nicholas G. Samra, Austin, TX (US); Stephen J. Jourdan, Portland, OR (US)

(73) Assignee: Intel Corporation, Santa Clara, CA (US)

(*) Notice: Subject to any disclaimer, the term of this patent is extended or adjusted under 35 U.S.C. 154(b) by 438 days.

(21) Appl. No.: 10/180,387

(22) Filed: Jun. 25, 2002

(65) Prior Publication Data
US 2003/0236967 A1 Dec. 25, 2003

(51) Int. Cl.
*G06F 9/12* (2006.01)
(52) U.S. Cl. .................................. 712/210; 712/244
(58) Field of Classification Search ............. 712/210, 712/243, 244, 211, 24
See application file for complete search history.

(56) References Cited

U.S. PATENT DOCUMENTS

| | | | |
|---|---|---|---|
| 4,858,105 A | 8/1989 | Kuriyama et al. | |
| 5,475,824 A | 12/1995 | Grochowski et al. | |
| 5,530,825 A | 6/1996 | Black et al. | |
| 5,559,977 A | 9/1996 | Avnon et al. | |
| 5,598,546 A | 1/1997 | Blomgren | |
| 5,617,549 A | 4/1997 | DeLano | |
| 6,131,158 A | 10/2000 | Matsuo et al. | |
| 6,199,152 B1* | 3/2001 | Kelly et al. | 711/207 |
| 6,330,657 B1* | 12/2001 | Col et al. | 712/23 |

OTHER PUBLICATIONS

Zarka Cvetanovic and Dileep Bhandarkar, "Characterization of Alpha AXP Performance Using TP and Spec Workloads", 1994, Digital Equipment Corp., Boxborough, Mass., USA.

* cited by examiner

*Primary Examiner*—Henry W. H. Tsai
(74) *Attorney, Agent, or Firm*—Erik M. Metzger (57) ABSTRACT

Fusing micro-operations (uops) together. Intra-instruction fusing can increase cache memory storage efficiency and computer instruction processing bandwidth within a microprocessor without incurring significant computer system cost. Uops are fused, stored in cache memory, un-fused, executed in parallel, and retired in order to optimize cost and performance.

13 Claims, 10 Drawing Sheets

INTRA-INSTRUCTION FUSION

FIELD

Embodiments of the invention relate to the field of instruction caching within a computer system. More particularly, embodiments of the invention relate to improving storage efficiency within a cache memory and increasing instruction throughput within a microprocessor without significantly increasing computer system cost.

BACKGROUND

Cache memory is used in computer systems in order to increase performance by alleviating the need for a processor to fetch instructions from main system memory sources, such as dynamic random-access memory (DRAM). DRAM and other main memory sources may require longer access times due to paging and memory cell access speed, which can cause the processor to incur wait-states and degrade computer system performance.

Cache memory, on the other hand, allows the processor to fetch instructions quickly without incurring the wait-states associated with main memory sources, such as DRAM. Cache memory improves computer system performance by making commonly-used instructions available to the processor without requiring paging cycles, by using a relatively fast-access memory cell, and by being in close proximity to the processor's local bus in order to reduce physical delay associated with bus structures.

Similarly, instruction caches can also be used within high-performance microprocessors to decrease the average instruction fetch latency. In order to further decrease fetch latency, instructions may be cached in decoded or "micro-op" (uop )format. Advantageously, caching instructions in uop format can decrease instruction decode logic within microprocessor, since only instructions fetched as a result of a cache miss need be decoded.

Figure 1:
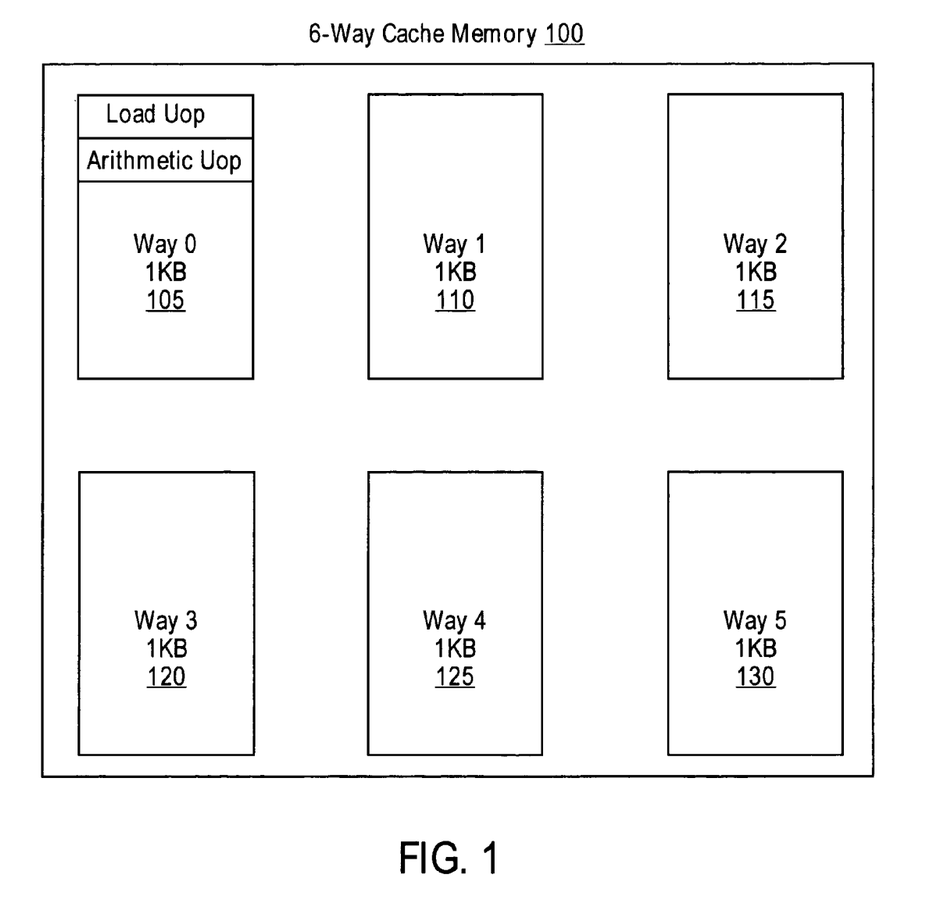
FIG. 1 illustrates a prior art instruction storage scheme within a cache memory.

Typically, only one uop is able to be stored within each cache memory entry, as illustrated in FIG. 1 Furthermore, some instructions contain more than one uop, resulting in more than one cache entry being used to store a single instruction.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention described herein pertain to increasing cache memory storage efficiency and computer instruction processing bandwidth within a microprocessor without incurring significant computer system cost. More particularly, embodiments of the invention relate to "fusing" together at least two micro-operations (uops) within a computer instruction and storing the fused uop within a single cache memory entry.

Figure 2:
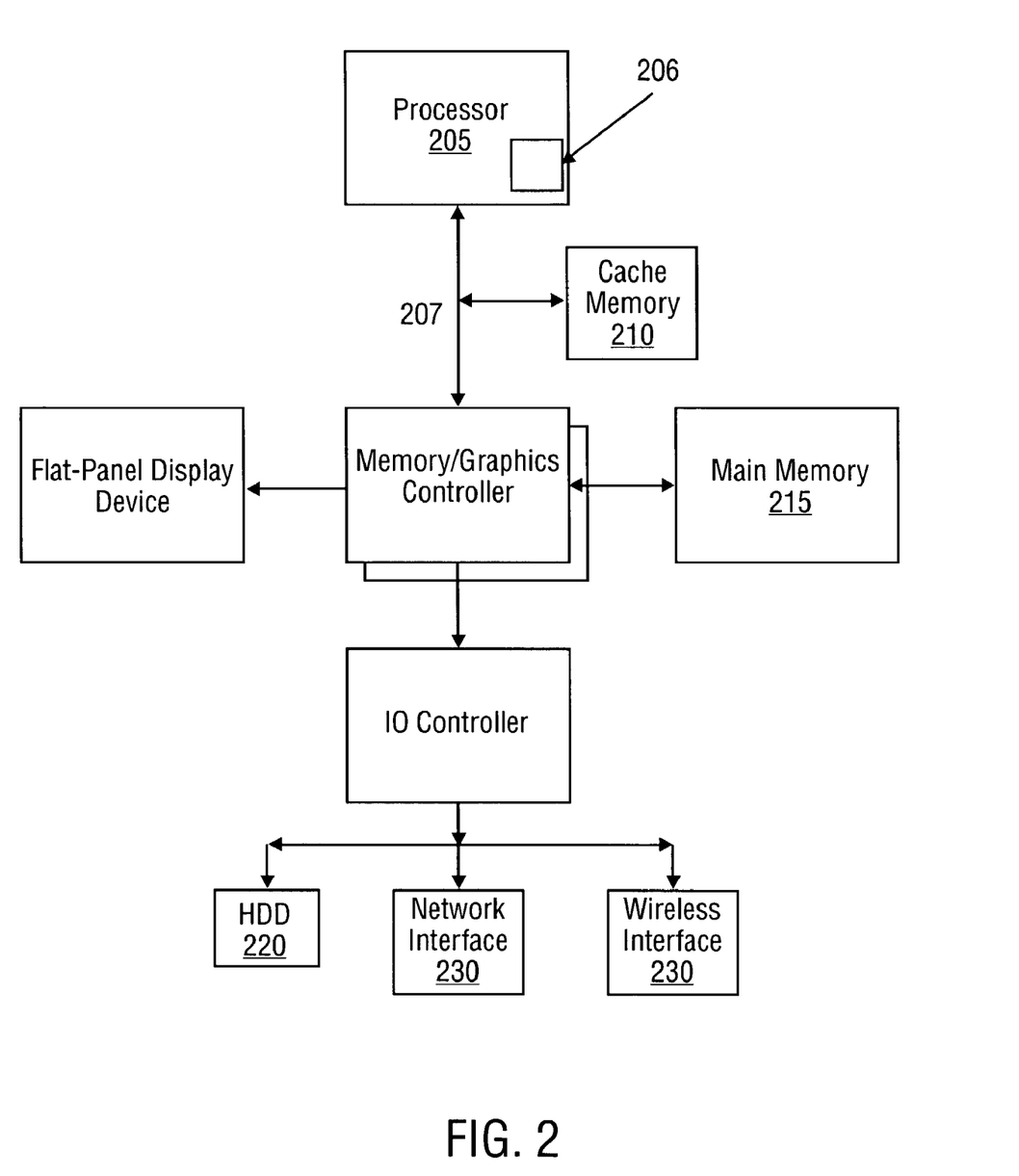
FIG. 2 illustrates a computer system that may be used in conjunction with one embodiment of the invention.

FIG. 2 illustrates a computer system that may be used in conjunction with one embodiment of the invention. A processor 205 accesses data from a cache memory 210 and main memory 215. Illustrated within the processor of FIG. 2 is the location of one embodiment of the invention 206. However, embodiments of the invention may be implemented within other devices within the system, as a separate bus agent, or distributed throughout the system. The main memory may be dynamic random-access memory (DRAM), a hard disk drive (HDD) 220, or a memory source 230 located remotely from the computer system containing various storage devices and technologies. The cache memory may be located either within the processor or in close proximity to the processor, such as on the processor's local bus 207. Furthermore, the cache memory may be composed of relatively fast memory cells, such as six-transistor (6T) cells, or other memory cells of approximately equal or faster access speed.

Figure 3:
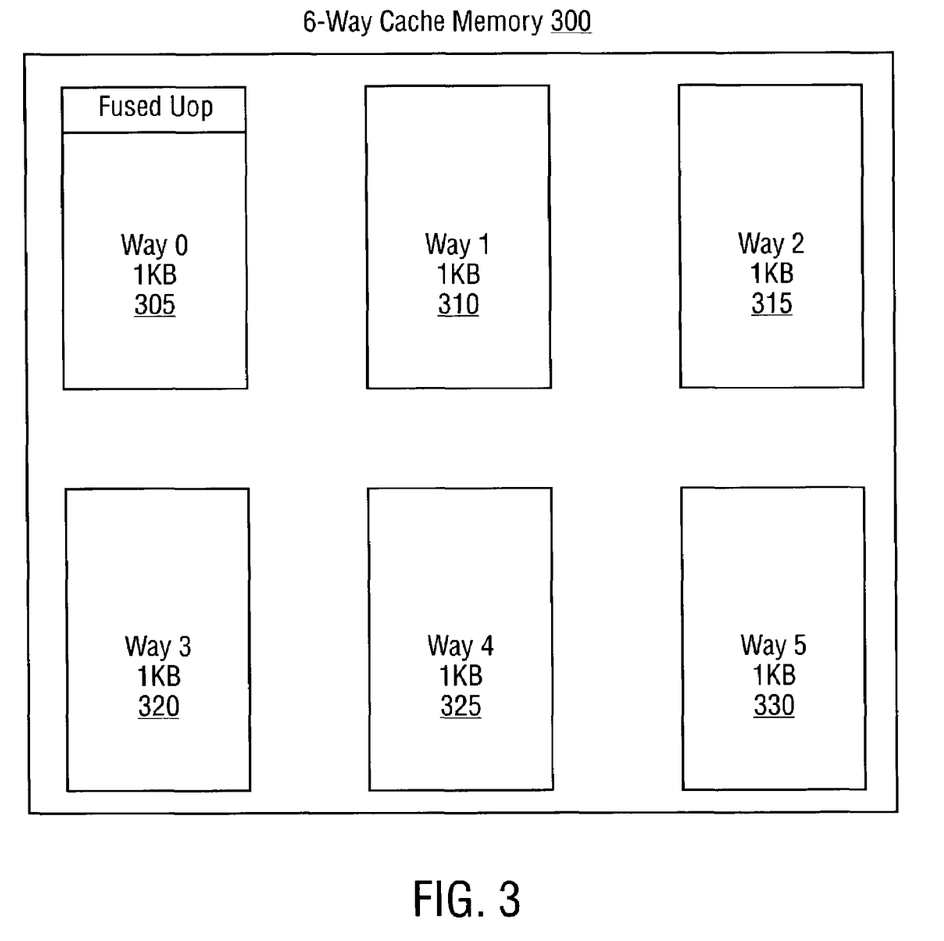
FIG. 3 illustrates a cache memory that may be used in conjunction with one embodiment of the invention.

FIG. 3 illustrates an example of a cache memory that may be used in conjunction with one embodiment of the invention. The cache memory 300 of FIG. 3 may store up to 6 KB of data, organized in 6 ways 305–330 of 1 KB each, in order to optimally meet the performance needs of a computer system, such as the one illustrated in FIG. 2. Each entry of the cache memory of FIG. 3 is able to store at least one micro-operation (uop) corresponding to an instruction. However, when used in conjunction with embodiments of the present invention, the cache memory of FIG. 3 may be used to store a fused uop corresponding to two uops.

The cache memory of FIG. 3 is one example of a cache memory that may be used in conjunction with embodiments of the invention. Larger cache memories may be used that more appropriately fit the performance needs of a particular microprocessor or computer system. For example, a 48 KB cache memory organized as 48 ways of 1 KB each may be used in conjunction with one embodiment of the invention. In this example, each cache entry traditionally stores only one uop for a total capacity of 4800 uops, assuming a uop size of 10 B. However, when used in conjunction with at least one embodiment of the invention, the cache memory may store twice the number of uops in the same amount of storage space.

Typically, each cache memory entry is able to only store one uop at a time. However, at least one embodiment of the invention enable the storage of multiple uops within a single instruction to be stored within a single cache entry. An instruction may be stored within main memory as a complex instruction (instruction containing more than one uop), such as in a complex instruction set computing (CISC) architecture. When a complex instruction is read from main memory and loaded into a cache memory, it may be decoded into component uops. The decoding may be performed using prior art techniques with complementary metal-oxide semiconductor (CMOS) logic circuitry, by software executed by a microprocessor, or a combination of hardware and software.

Uops typically do not vary in size, but the instruction to which they correspond often do depending on the instruction and the microarchitecture for which the uop was designed. For example, a 32-bit microprocessor may have instructions having 32 bits, whereas other instructions within the same instruction set may have only 16 bits, two of which may be included within the same 32-bit instruction.

Uops typically include fields, such as an opcode, register, and immediate fields. The particular opcode(s), registers, and immediates supported by a particular uop vary, depending on the type of uop. Some instructions contain multiple uops, each performing a part of a complex instruction.

For example, complex instructions that may be performed in conjunction with one embodiment of the invention are a pop and return instructions. In an instruction set, such as an Intel Architecture 32-bit (IA-32) instruction set supplied by Intel Corporation of Santa Clara, Calif., a pop instruction has a load uop to load the value at the top of a stack and an arithmetic stack pointer update uop to manipulate the stack pointer. Similarly, a return instruction having a load and an arithmetic uop, in addition to a jump uop. Traditionally, the load and arithmetic uops of the pop and return instructions are stored in separate cache entries, but in at least one embodiment of the invention they may be stored within the same cache entry.

Another example of complex instructions that may be performed in conjunction with one embodiment of the invention are the push and call instructions. In an instruction set, such as an IA-32 instruction set, the push instruction includes a store address uop, which generates an address for indicating the top entry of a stack; a store data uop, which provides data to be pushed onto the stack; and an arithmetic uop to update a stack pointer.

Similarly, the call instruction includes a store address uop, a store data uop, and an arithmetic uop, in addition to a jump uop. Traditionally, the store address uop, store data uop, and arithmetic uop of the push and call instructions are stored in separate cache entries, but in at least one embodiment of the invention they may be stored within the same cache entry.

Another example of a complex instruction that may be performed in conjunction with one embodiment of the invention is the store instruction. In an instruction set, such as an IA-32 instruction set, the store instruction includes a store address uop, which generates an address, and a store data uop, which provides data to be written to memory. Traditionally, the store address uop and store data uop are stored in separate cache entries, but in at least one embodiment of the invention they may be stored within the same cache entry.

Yet another example of complex instructions that may be performed in conjunction with one embodiment of the invention are the increment and decrement instructions. In an instruction set, such as an IA-32 instruction set, an increment instruction includes an add+1 uop and a condition flag update uop. Similarly, a decrement instruction includes a subtract−1 uop and a condition flag update uop. Traditionally, the add+1/subtract−1 uop and the condition flag update uop are stored in separate cache entries, but in at least one embodiment of the invention they may be stored within the same cache entry.

The instructions described above are IA-32 instructions. However, other types of instructions in other instruction sets may be used in conjunction with embodiments of the invention, including instructions used in reduced instruction-set computing (RISC) architectures.

Furthermore, embodiments of the invention may be used in various embodiments such that other instructions, besides those described above, containing multiple uops may have their uops stored in the same cache entry.

An instruction residing in memory may be read into a cache memory residing either within the microprocessor or in close proximity to the microprocessor. Before being stored within the cache memory, the instruction can be decoded into the separate uops of which it is composed. Traditionally the separate uops are stored within separate entries of the cache memory. However, at least one embodiment of the invention enables the storage of intra-instruction uops (uops within a single instruction) into one cache entry.

Figure 4:
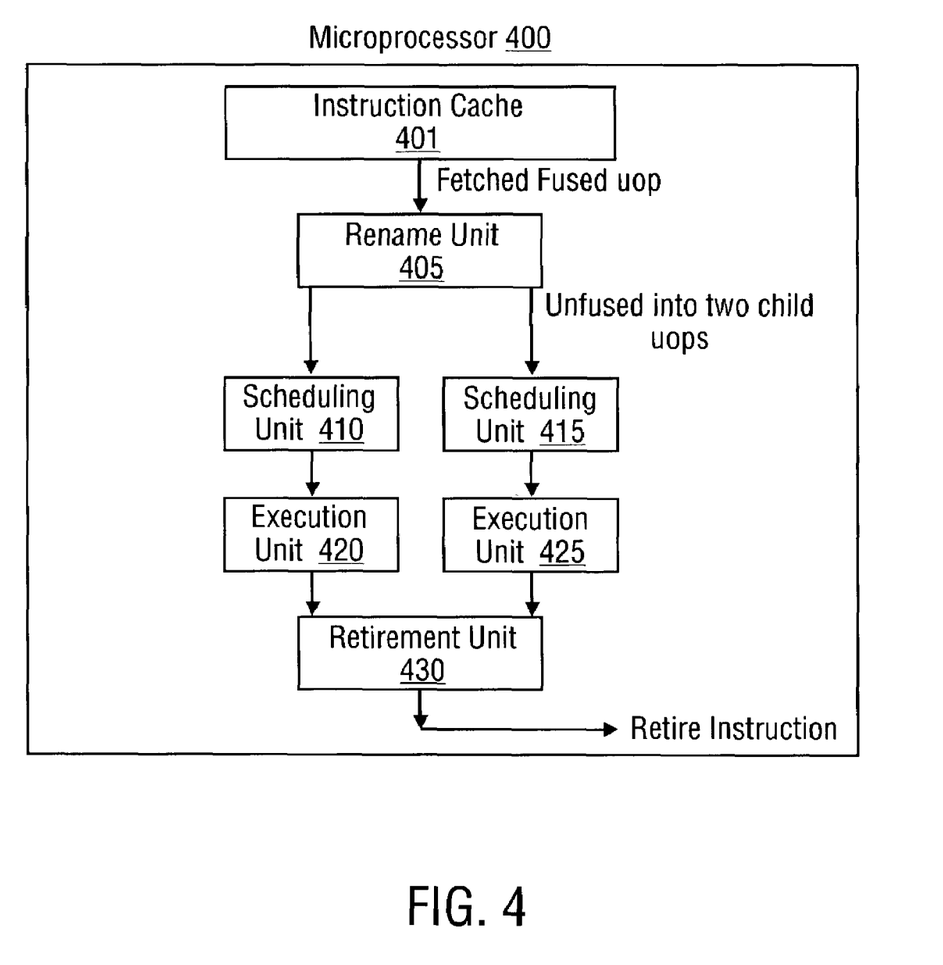
FIG. 4 illustrates a microprocessor architecture to support at least one embodiment of the invention.

FIG. 4 illustrates a microprocessor architecture that may be used in conjunction with the invention according to one embodiment. An instruction read into the cache memory from a main memory source, such as dynamic random-access memory (DRAM), is first decoded into separate uops. The separate uops are then fused into a single uop by encoding the separate uops so as to store both uops within in one entry of the instruction cache 401. The decoding and encoding may be implemented using prior art techniques with standard complementary metal-oxide semiconductor (CMOS) circuitry, software, or a combination thereof.

Once the fused uop is stored within the instruction cache, it can be fetched by the rename unit 405 where it is decoded (unfused) into separate child uops. Each child uop is further processed by a different parallel scheduling unit 410 and execution unit 415. Each execution unit executes a child uop according to register dependencies of the child uop and scheduling algorithms implemented by the corresponding scheduling unit. The child uops are then stored in, or "collected" by, the retirement unit 420 until both uops have successfully executed and the corresponding instruction is ready for retirement.

The processor architecture illustrated in FIG. 4 may be used to process fused uops including two child uops, such as those of a pop/return instruction, data/address store instruction, or increment/decrement instruction. FIG. 4 illustrates a processor architecture which may be used to process fused uops including three child uops, such as those of a push instruction or call instruction.

The processor architecture of FIG. 4 may be expanded to accommodate processing of fused uops containing more than three child uops by increasing the number of parallel scheduling and execution units accordingly.

Advantageously, embodiments of the invention may be implemented using a minimal number of hardware and/or software modifications. In fact, there are three general rules that can be followed in order to implement at least one embodiment with minimal hardware or software modifications:

1. Only one of the child uops of a fused uop may generate an exception in order to limit the complexity of the retirement unit necessary to process fused uops.

2. Each child uop must be sent to a different scheduling unit in order to allow all child uops to be issued simultaneously to the scheduling units without requiring additional scheduling unit ports.

3. The child uops must utilize only the existing fields of the original instruction uop, such as the opcode field, registers, immediates, etc. This allows uops to be stored within the same entry of an instruction cache without incurring a die size increase.

In many cases, uop fields are identical between two uops within an instruction, and may therefore be combined relatively easily. However, in some instances, the register fields may require special fusing/unfusing techniques in order to facilitate execution of the child uops.

In the case of an arithmetic/load instruction, for example, the opcode field of each child uop is encoded with information pertaining to both the arithmetic operation and the load operation. When the opcode is presented to a load execution unit, the information corresponding to the load operation is decoded and executed, whereas when the field is presented to the arithmetic execution unit the arithmetic information is decoded and executed.

In order to extract the proper information from the child uop opcode, each execution unit of FIG. 4 uses decoding hardware, software, or a combination thereof, to recognize the opcode information to which the execution unit corresponds. This allows the execution units to operate in parallel upon the respective opcode information to which they correspond.

Uops typically use registers to store data in ways unique to the needs of the uop. Therefore, when the fused uop is unfused into separate child uops, the register assignment may be unique to the particular uop or uop pairs involved. In one embodiment, the rename unit manages the assignment of registers for unfused uops, using special register unfusing techniques, such as the one illustrated in FIG. 5.

Figure 5:
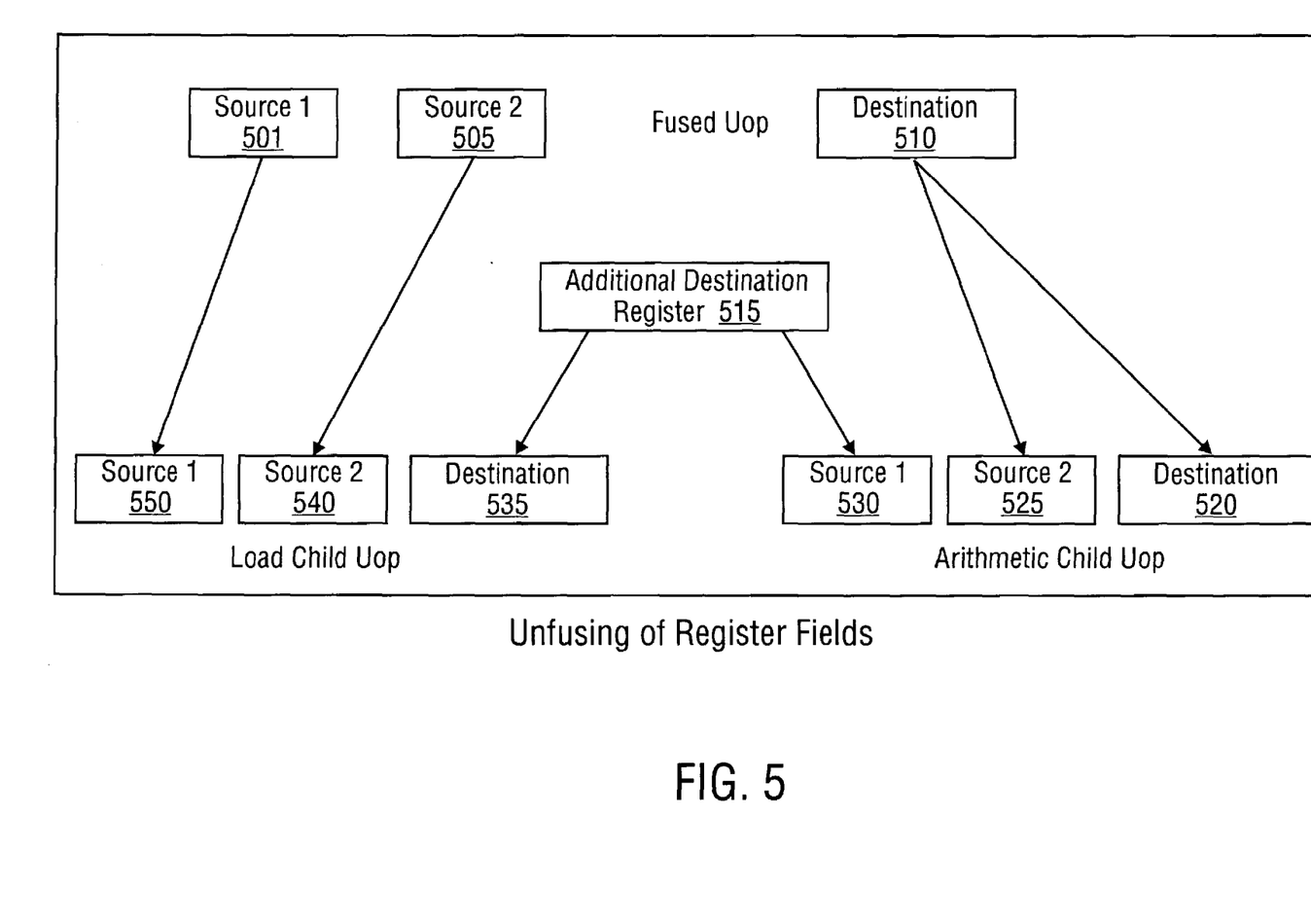
FIG. 5 illustrates a fused/unfused uop field assignment map for a Load/Arithmetic instruction according to one embodiment of the invention.

FIG. 5 illustrates a register assignment scheme according to one embodiment of the invention. A fused arithmetic/load uop typically has two source fields and one destination field, whereas the corresponding unfused child uops may each require two source fields and a destination field, respectively.

As illustrated in FIG. 5, both source fields 501 505 of the fused uop are assigned to the two source registers 550 540 of the load child uop. However, a new destination register 515 is assigned to relay the destination field 535 of the load child uop. The newly assigned destination register is not assigned to any logical register in the rename unit, but is used to forward the load child uop destination field to the first source register 530 of the arithmetic child uop. The destination field 510 of the fused uop is assigned both to the second source register 525 for the arithmetic child uop as well as to its destination register 520.

The result of the register unfusing technique illustrated in FIG. 5 is a load child uop that will generate an address including two operands followed by an arithmetic child uop which will operate on the destination register containing the data produced by the load operation.

Figure 5A:
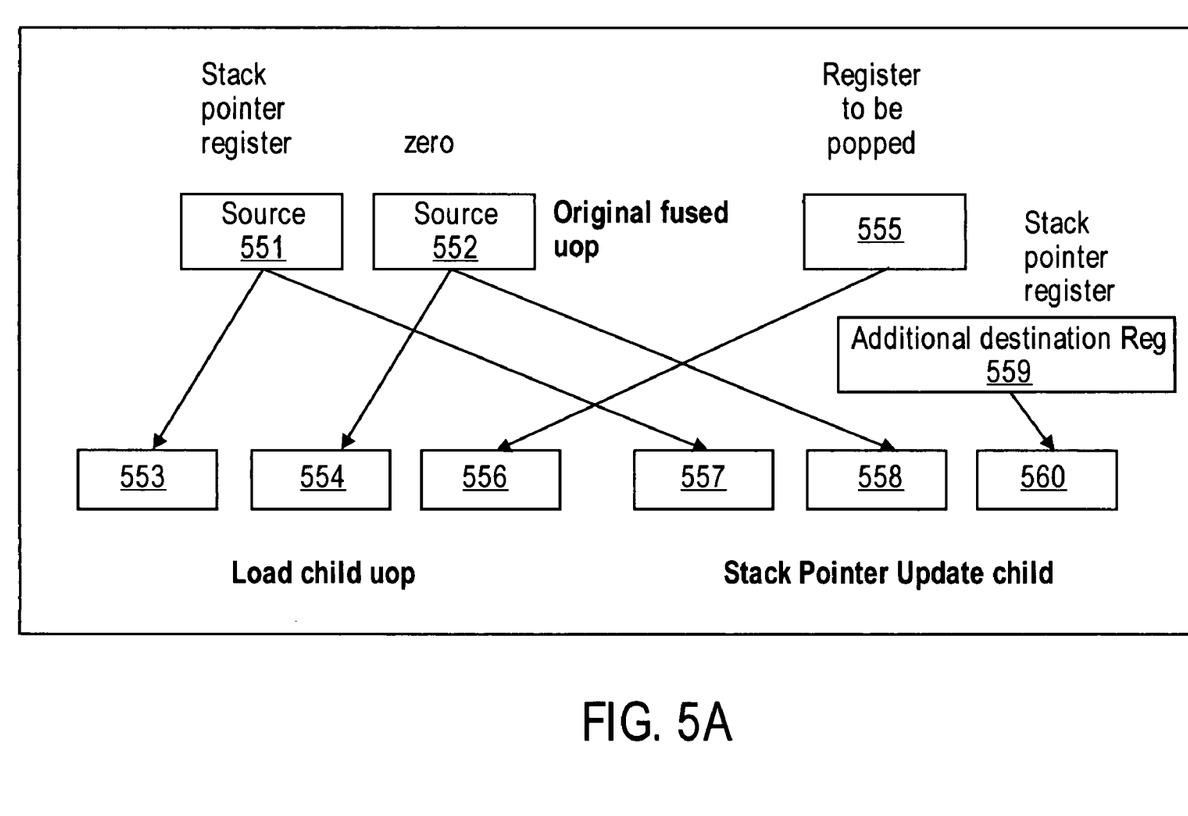
FIG. 5*a* illustrates a fused/unfused uop field assignment map for a Load/Stack Pointer Update instruction according to one embodiment of the invention.

FIG. 5a illustrates a register unfusing technique corresponding to pop and return instructions in accordance with one embodiment of the invention. As previously mentioned, pop and return instructions may each include a load and arithmetic uop, which may be fused and stored in a single cache entry. When the rename unit unfuses the fused uops into child load and arithmetic uops for further processing, the fused register fields are assigned to registers according to the assignment scheme illustrated in FIG. 5a.

In the assignment scheme illustrated in FIG. 5a, both source fields 551 552 of the fused uop are assigned to the two source registers 553 554 of the load child uop. Typically, the first source field corresponds to a stack pointer to determine an address of the top of a stack to which the pop and return instructions correspond. The second source field may or may not be used and therefore may simply contain null data, such as zero. The destination field of the fused uop 555 corresponds to a value popped from the stack, which is then assigned to the destination register 556 of the load child uop.

Likewise, the stack pointer update child uop derives the first and second sources 557 558 from the first and second source fields of the fused uop, respectively. However, the destination field 559 corresponds to the stack pointer itself and is therefore assigned directly to the destination register 560 of the stack pointer update child uop. Special hardware, software, or a combination thereof may be needed to write the stack pointer to a second destination register 560 not part of the fused uop registers. However, other embodiments may require different register assignment schemes, than the one illustrated in FIG. 5a, and therefore different hardware and/or software modifications.

Figure 5B:
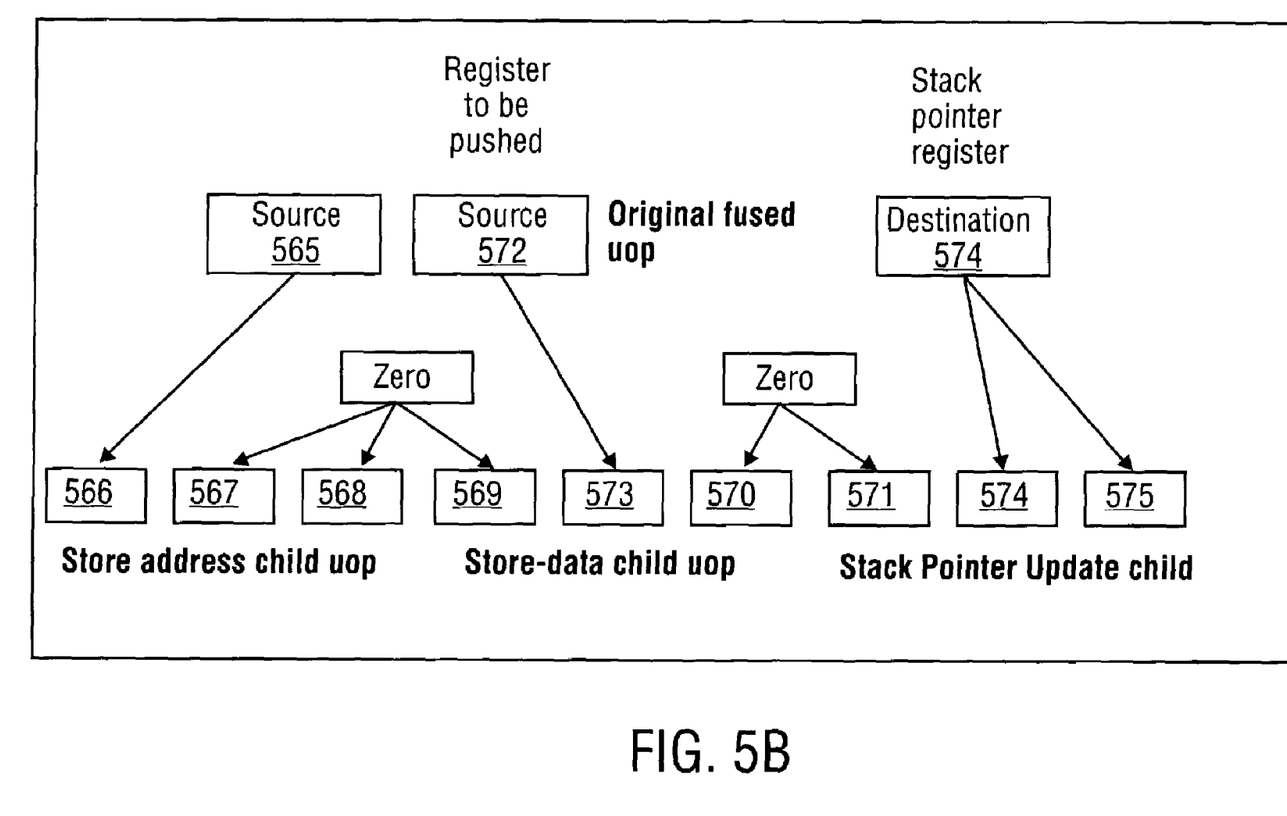
FIG. 5*b* illustrates a fused/unfused uop field assignment map for a Store Address Child/Store-data Child/Stack Pointer Update instruction according to one embodiment of the invention.

FIG. 5b illustrates a register unfusing technique corresponding to push and call instructions in accordance with one embodiment of the invention. As previously mentioned, push and call instructions may each include a store address uop, a store data uop, and an arithmetic uop, all of which may be fused and stored in a single cache entry. When the rename unit unfuses the fused uops into child store address, store data, and arithmetic uops for further processing, the fused register fields are assigned to registers according to the assignment scheme illustrated in FIG. 5b.

In the assignment scheme illustrated in FIG. 5b, the first source field 565 of the fused uop is assigned to the first source register 566 of the store-address child uop. The second source register 567 and the destination register 568 of the store-address child uop as well as the first source register 569 and the destination register 570 of the store-data child uop and the first source register 571 of the stack pointer update child uop may or may not be used and therefore may simply contain null data, such as zero. The second source field 572 of the fused uop is assigned to the second source register 573 of the store-data child uop, which corresponds to a value to be pushed onto a stack. The destination field 574 of the fused uop is assigned to the second source 575 and destination registers 576 of the stack pointer update uop.

A fused uop corresponding to a call instruction may use a similar register assignment scheme as that illustrated in FIG. 5b. However, call instructions also include a jump uop which are stored separately within the cache and therefore are not subject to the register assignment technique illustrated in FIG. 5b.

Figure 5C:
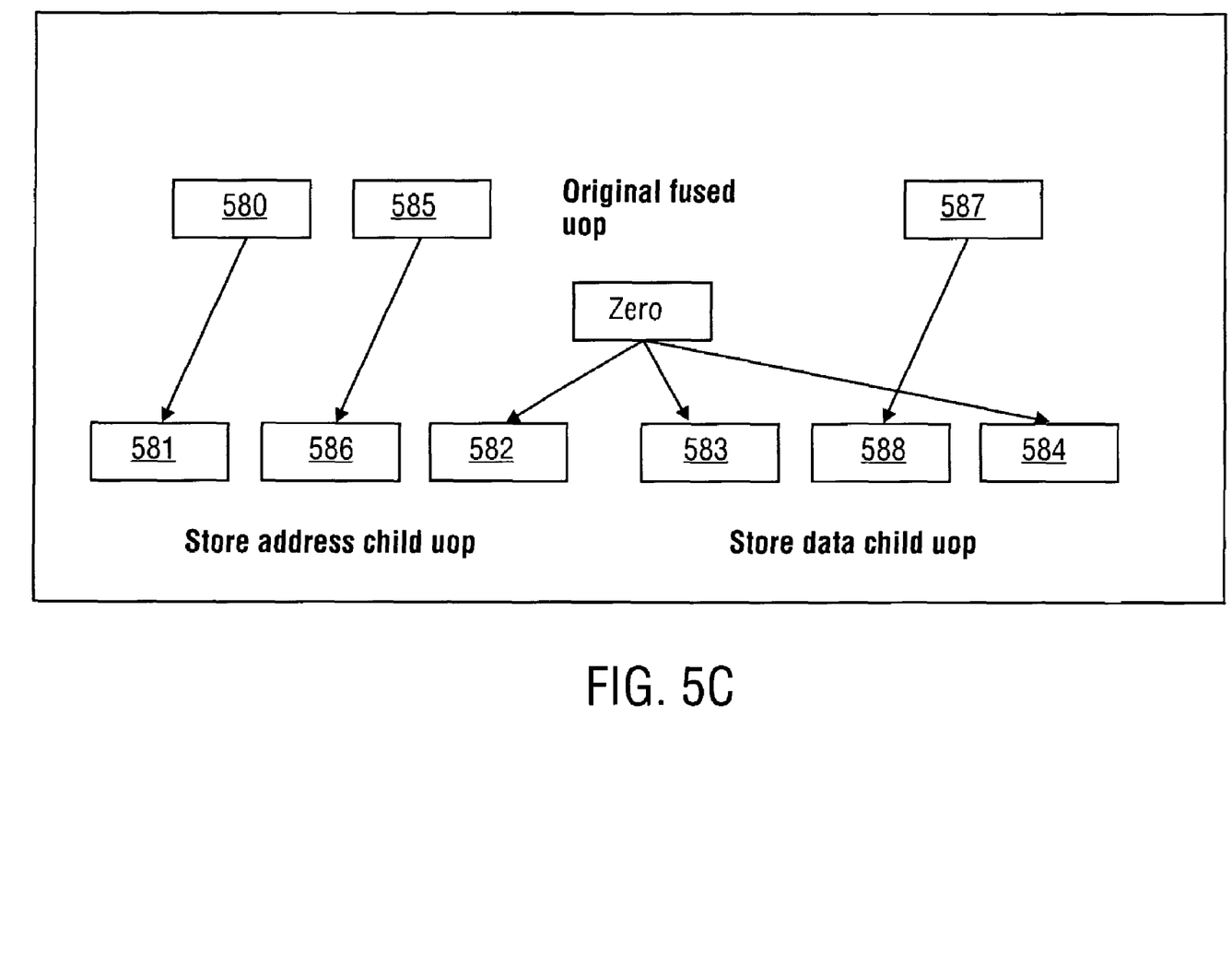
FIG. 5*c* illustrates a fused/unfused uop field assignment map for a Store Address Child/Store Data Child instruction according to one embodiment of the invention.

FIG. 5c illustrates a register unfusing technique corresponding to a store instruction in accordance with one embodiment of the invention. As previously mentioned, a store instruction may include a store address uop and a store data uop, which which may be fused and stored in a single cache entry. When the rename unit unfuses the fused uops into child store address and store data uops for further processing, the fused uop register fields are assigned to registers according to the assignment scheme illustrated in FIG. 5c.

In the assignment scheme illustrated in FIG. 5c, the first source field 580 of the fused uop is assigned to the first source 581 register of the store-address child uop. The first source register 582 and the destination register 583 of the store-data child uop as well as the destination register 584 of the store-data child uop may or may not be used and therefore may simply contain null data, such as zero. The second source field 585 of the fused uop is assigned to the second source register 586 of the store-address child uop. The destination field 587 of the fused uop is assigned to the second source register 588 of the store-data child uop.

Figure 5D:
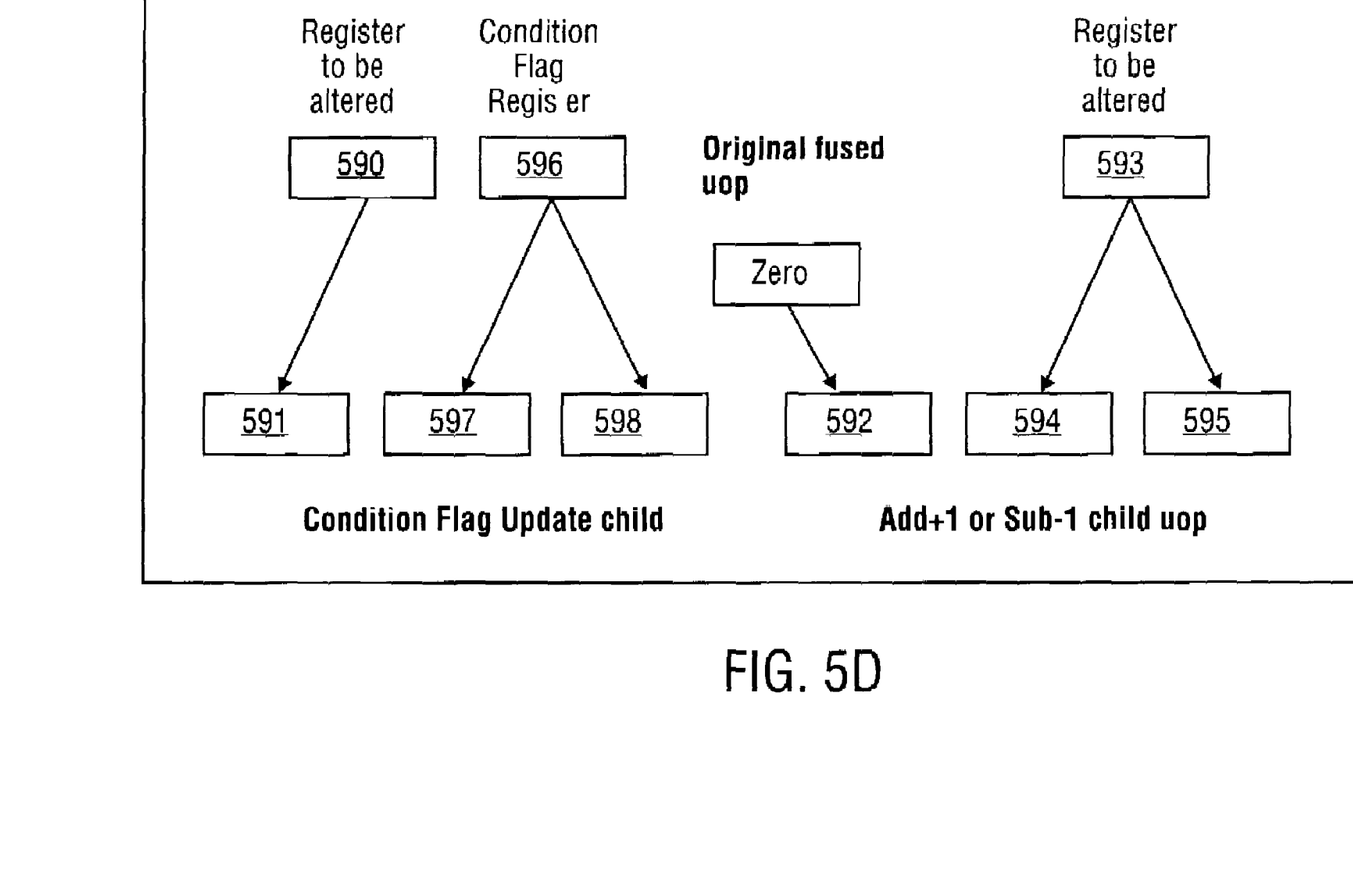
FIG. 5*d* illustrated a fused/unfused uop field assignment map for a Condition flag Update/Add+1 or sub−1 instruction according to one embodiment of the invention.

FIG. 5*d* illustrates a register unfusing technique corresponding to increment and decrement instructions in accordance with one embodiment of the invention. As previously mentioned, increment/decrement instructions may each include an add-one/subtract-one uop, and a condition flag update uop, which may be fused and stored in a single cache entry. When the rename unit unfuses the fused uops into child add-one/subtract-one and condition flag update uops for further processing, the fused register fields are assigned to registers according to the assignment scheme illustrated in FIG. 5*d*.

In the assignment scheme illustrated in FIG. 5*d*, the first source field 590 of the fused uop is assigned to the first source register 591 of the condition flag update child uop. The first source register 592 of the add-one/subtract-one uop may or may not be used and therefore may simply contain null data, such as zero. The destination field 593 of the fused uop is assigned to the second source register 594 and destination register 595 of the add-one/subtract-one child uop. Finally, the second source field 596 of the fused uop is assigned to the second source register 597 and the destination register 598 of the condition flag update child uop.

Figure 6:
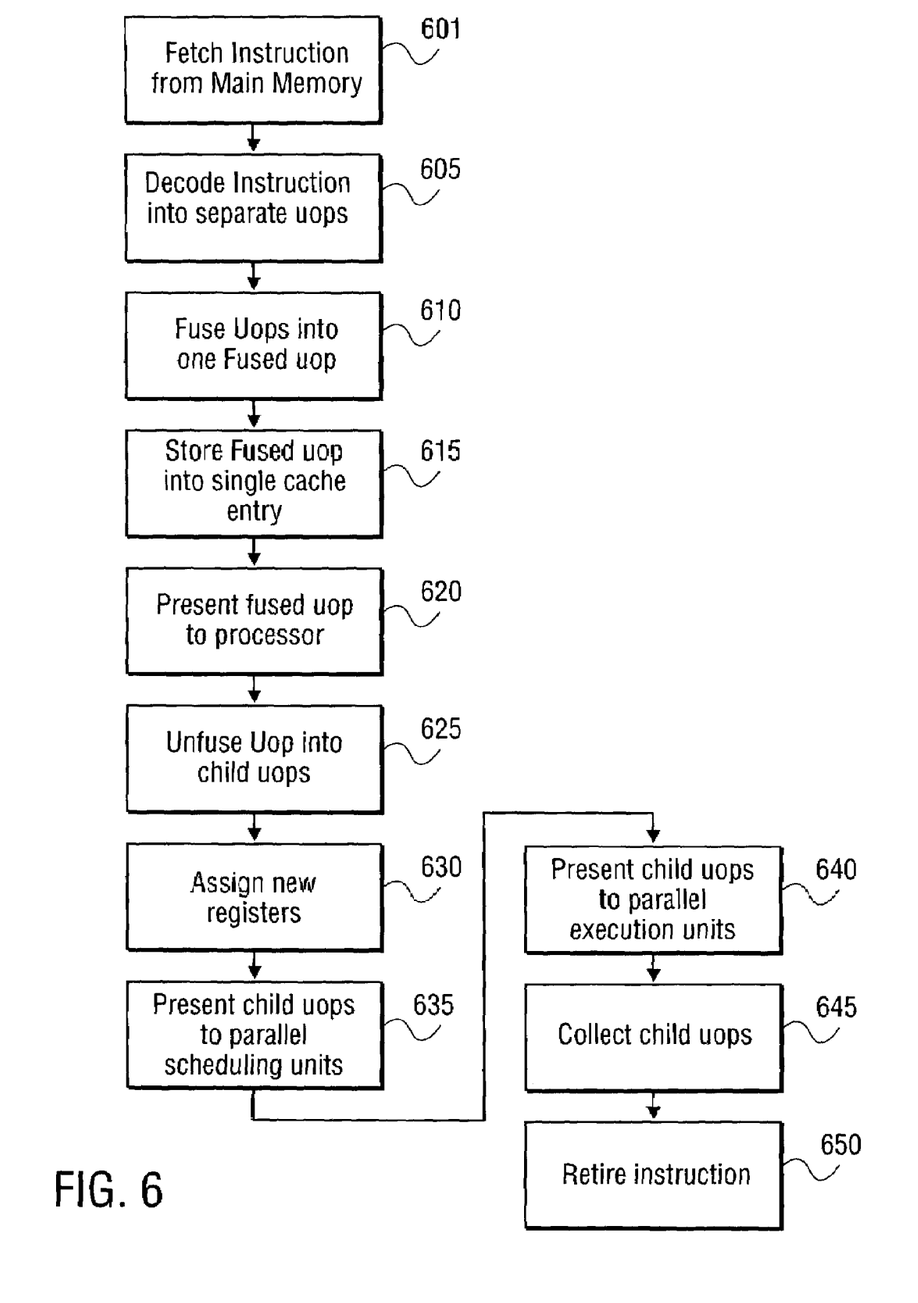
FIG. 6 is a flow chart illustrating how the invention may be used according to one embodiment.

FIG. 6 is a flow chart illustrating intra-instruction fusing/unfusing of an instruction, according to one embodiment. The instruction is fetched from main memory 601 and decoded into separate uops 605 before both are stored within a single cache entry 610. The separate uop fields (opcode, registers, immediates, etc.) each share a corresponding uop field within the fused uop cache entry 615. The uops are then retrieved from cache and presented to a microprocessor rename unit 620 where they are unfused into separate child uops 625. As part of the unfusing process, the fused register fields are assigned to new registers 630 so that the uops may be scheduled and executed separately.

The child uops are presented to different scheduling units 635 in parallel where they are prepared for execution 640 by two separate parallel execution units. The execution units decode opcode information from a common opcode field corresponding to each child uop. The information pertaining to the particular child uop that an execution is operating upon is interpretted by the execution unit and the information pertaining to the other child uop is ignored.

Finally, once both child uops have executed, they are collected 645 by the retire unit, which then retires the instruction 650.

The invention has been described herein by way of example without limiting the invention to any particular embodiment. Furthermore, embodiments of the invention facilitate numerous ways in which to take advantage of higher density instruction storage and is not limited to the advantages described herein.

For example, in addition to allowing for higher density instruction storage in cache memory without incurring additional cache capacity or significant die cost, embodiments of the invention enable increased fetch and rename throughput by operating on multiple uops at a time. In a processor with a fetch/rename throughput of 4 uops per cycle, the same processor may increase the fetch/rename throughput to 8 uops per cycle using at least one embodiment of the invention. Furthermore, since each fused uop only requires one entry in the retirement unit, the maximum number of unfused uops in the processor at any time as well as the retirement throughput may increase accordingly.

Embodiments of the invention may include various implementations, including circuits (hardware) using complimentary metal-oxide-semiconductor (CMOS) technology, machine-readable media with instructions (software) to perform embodiments of the invention when executed by a machine, such as a processor, or a combination of hardware and software.

In the foregoing specification the invention has been described with reference to specific exemplary embodiments. It will, however, be evident that various modifications and changes may be made thereto without departing from the broader spirit and scope of the invention. The specification and drawings are, accordingly, to be regarded in an illustration rather than a restrictive sense.

What is claimed is:

1. An apparatus comprising:
    a receiving unit to receive a fused micro-operation (uop), said fused uop comprising data corresponding to a plurality of uops from a same instruction;
    a rename unit to unfuse said fused uop into a plurality, of child uops, said plurality of child uops comprising a load child uop and a stack-pointer update child uop, wherein the rename unit is to:
    assign a first source field of said fused uop to a first source register of said at least two child uops;
    assign a second source field of said fused uop to a second source register of said at least two child uops;
    assign a destination field of said fused uop to a destination register of said load child uop;
    assign a stack pointer to a destination register of said stack pointer update child uop.

2. The apparatus of claim 1 further comprising a plurality of execution units to execute said plurality of child uops in parallel.

3. The apparatus of claim 2 wherein each of said plurality of execution units are able to execute an opcode corresponding to only one of said plurality of child uops.

4. The apparatus of claim 3 further comprising a retirement unit to retire said instruction after said plurality of child uops have been executed by said execution unit.

5. The apparatus of claim 4 wherein only one of said plurality of child uops may generate an exception.

6. The apparatus of claim 5 further comprising a plurality of scheduling units to schedule said plurality of child uops in parallel for execution by said plurality of execution units.

7. An apparatus comprising:
    means for receiving a fused micro-operation (uop), said fused uop comprising data corresponding to a plurality of uops from a same instruction;
    means for renaming registers and unfusing said fused uop into a plurality of child uops, said plurality of child uops comprising a load child uop and a stack-pointer update child uop, wherein the means for renaming comprises:
    means for assigning a first source field of said fused uop to a first source register of said at least two child uops;
    means for assigning a second source field of said fused uop to a second source register of said at least two child uops;
    means for assigning a destination field of said fused uop to a destination register of said load child uop;
    means for assigning a stack pointer to a destination register of said stack pointer update child uop.

8. The apparatus of claim 7 further comprising means for executing said plurality, of child uops in parallel.

9. The apparatus of claim 8 wherein each of said means for executing is able to execute an opcode corresponding to only one of said plurality of child uops.

10. The apparatus of claim 9 further comprising means to retire said instruction after said plurality of child uops have been executed by said means for execution.

11. The apparatus of claim 10 wherein only one of said plurality of child uops may generate an exception.

12. The apparatus of claim 11 further comprising means of scheduling said plurality of child uops in parallel for execution by said means for execution.

13. The apparatus of claim 12 wherein said means for renaming and said means for unfusing are the same functional unit.

\* \* \* \* \*

UNITED STATES PATENT AND TRADEMARK OFFICE
CERTIFICATE OF CORRECTION

PATENT NO. : 7,051,190 B2 Page 1 of 1
APPLICATION NO. : 10/180387
DATED : May 23, 2006
INVENTOR(S) : Samra et al.

It is certified that error appears in the above-identified patent and that said Letters Patent is hereby corrected as shown below:

In column 1, at line 35, after "within" insert --the--.
In column 2, at line 4, delete "illustrated" insert --illustrates--.
In column 2, at line 5, delete "flag" insert --Flag--.
In column 7, at line 33, delete "cache-and" insert --cache and--.
In column 8, at line 21, after "plurality" delete ",".
In column 8, at line 67, after "plurality" delete ",".

Signed and Sealed this

Fourth Day of September, 2007

JON W. DUDAS
*Director of the United States Patent and Trademark Office*